United States Patent

Klimstra

[15] 3,682,922

[45] Aug. 8, 1972

[54] N-ACYL-N-[(N',N'-DISUBSTITUTED AMINO)-ALKYL]-1-ADAMANTYLMETHYLAMINES

[72] Inventor: Paul D. Klimstra, Northbrook, Ill.

[73] Assignee: G. D. Searle & Co., Chicago, Ill.

[22] Filed: Jan. 16, 1969

[21] Appl. No.: 791,779

[52] U.S. Cl. .260/268 PC, 260/247.2 A, 260/293.86, 260/326.85, 260/561 R, 424/248, 424/250, 424/267, 424/274, 424/320
[51] Int. Cl. ............................................. C07d 29/30
[58] Field of Search .............. 260/268 PC, 268 T, 326.85, 260/247.2 A, 293.86, 561 R

[56] References Cited

UNITED STATES PATENTS 3,532,748  10/1970  Smith .................. 260/563
3,352,912  11/1967  Prichard ............... 260/563
3,439,036  4/1969   Bernstein .............. 260/559
3,467,705  9/1969   Gigante et al. ........ 260/558

*Primary Examiner*—Lewis Gotts
*Assistant Examiner*—Ethel G. Love
*Attorney*—John M. Brown, John J. Kolano, Elliot N. Schubert, Walter C. Ramm and Helmuth A. Wegner

[57] ABSTRACT

The reduction of N-[(N', N'-disubstituted amino)-alkyl]adamantane-1-carboxamides affords the corresponding diamines, which are acylated to yield N-acyl-N-[(N',N'-disubstituted amino)alkyl]-1-adamantylmethylamines. The latter compounds are useful as pharmacological agents, as is evidenced by their anti-inflammatory, anti-microbial and anti-spasmodic properties.

9 Claims, No Drawings

N-ACYL-N-[(N',N'-DISUBSTITUTED AMINO)-ALKYL]-1-ADAMANTYLMETHYLAMINES

The present invention is concerned with novel compounds characterized by the adamantane ring system and, more particularly, with N-acyl-N-[(N',N'-disubstituted amino)alkyl]-1-adamantylmethylamines represented by the following structural formula

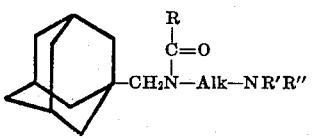

wherein R can be hydrogen or a lower alkyl radical, Alk denotes a lower alkylene radical and NR'R" represents a di-(lower alkyl)amino or heterocycloaliphatic amino radical.

Examples of the heterocycloaliphatic amino radicals encompassed by the NR'R" term are pyrrolidinyl, piperidino, morpholino and 4-(lower alkyl)piperazinyl.

The lower alkyl radicals represented in the foregoing formula are typified by methyl, ethyl, propyl, butyl, pentyl, hexyl, heptyl and the branched-chain radicals thereof.

The lower alkylene radicals depicted by Alk are exemplified by ethylene, trimethylene, tetramethylene, pentamethylene and the corresponding isomeric branched-chain radicals.

The compounds of the present invention are conveniently manufactured by processes which utilize as starting materials adamantanecarboxamides represented by the following structural formula

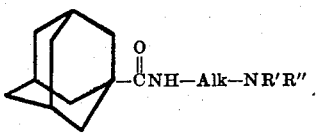

wherein Alk and NR'R" have the identical meanings as noted hereinbefore. Reduction of those carboxamides with a metallic hydride thus affords the corresponding intermediate diamines, which are acylated, typically with a lower alkanoic acid anhydride. Those processes are specifically illustrated by the reaction of N-(3-dimethylaminopropyl)adamantane-1-carboxamide in dioxane with lithium aluminum hydride to yield N-(3-dimethylaminopropyl)-1-adamantylmethylamine, which is contacted with formic anhydride—produced in situ by the interaction of acetic anhydride and formic acid—thus affording N-formyl-N-(3-dimethylaminopropyl)1-adamantylmethylamine.

The compounds of this invention exhibit valuable pharmacological properties. They are, for example, anti-inflammatory agents as is evidenced by their ability to inhibit the edematous swelling associated with inflammatory states. They possess also anti-spasmodic activity as demonstrated by their ability to inhibit the smooth muscle contracting property of bradykinin. In addition, these compounds exhibit anti-microbial activity as evidenced by their ability to inhibit the growth of bacteria such as *Diplococcus pneumoniae* and *Erwinia sp.*, protozoa such as *Tetrahymena gelleii*, algae such as *Chlorella vulgaris* and fungi such as *Trichophyton mentagrophytes, Trichophyton rubrum, Microsporum audouini, Microsporum nanum, Verticillium albo atrum* and *Ceratocystis ulmi*. They are, furthermore, anti-germinants as evidenced by their ability to inhibit the germination of *Trifolium repens*.

Illustrative of the anti-inflammatory property of the instant compounds is the activity of the representative compounds, i.e. N-formyl-N-(3-dimethylaminopropyl)-1-adamantylmethylamine, N-formyl-N-[3-(4-methylpiperazinyl)-propyl]-1-adamantylmethylamine, N-acetyl-N-(3-dimethylaminopropyl)-1-adamantylmethylamine and N-formyl-N-(3-pyrrolidinylpropyl)-1-adamantylmethylamine when tested in the following assay:

Each of a group of 10 intact male rats weighing 100–130 g. is injected under the plantar surface of each hind foot with 0.1 ml. of a 1 percent solution of carrageenin (Type 402, Marine Colloids, Inc.). The test compound, dissolved or suspended in saline, corn oil or propylene glycol, is administered subcutaneously or intragastrically 1 hour prior to the carrageenin injection. The doses normally employed are 25 mg. per rat subcutaneously or 5 mg. per rat intragastrically. Another such group serving as con-trols is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P<0.05$) in the swelling observed in control animals.

The anti-fungal property of the instant compounds is specifically illustrated by the activity of N-formyl-N-(3-piperidinopropyl)-1-adamantylmethylamine, N-formyl-N-(2-piperidinoethyl)-1-adamantylmethylamine, N-formyl-N-[3-(4methylpiperazinyl)propyl]-1-adamantylmethylamine, N-acetyl- N-(3-dimethylaminopropyl)-1adamantylmethylamine and N-formyl-N-(3-dimethylaminopropyl)-1-adamantylmethylamine when assayed by the following test procedure:

The test compound is dissolved or suspended in melted Sabouraud agar and is held at 80° C. for 20 minutes. Dilutions are made from this preparation in melted Sabouraud agar in order to yield concentrations of the test substance of 1,000, 100, 10 and 1 mcg./ml. in the agar. The agar is permitted to cool and solidify and is then surface inoculated with a suspension of spores of *Trichophyton mentagrophytes, Trichophyton rubrum, Microsporum adovini, Microsporum nanum, Verticillium albo atrum,* or *Ceratocystis ulmi*. The inoculated media are incubated at room temperature for 6–7 days, then are examined grossly for the presence or absence of growth of the test organism. Control preparations lacking the test compound are employed for comparative purposes. The activity of the compound is reported as mcg. of the compound/ml. of agar which completely prevents visible growth of the test organism.

Illustrative of the anti-bacterial property of the instant compounds is the activity of the representative compounds, i.e., N-formyl-N-(3- dimethylaminopropyl)-1-adamantylmethylamine, N-formyl-N,3-piperidinopropyl)-1-adamantyl-methylamine, N-formyl-N-(2-piperidinoethyl)-1-adamantylmethlamine, N-formyl-N-[3-(4-methylpiperazinyl)propyl]-1-adamantylmethylamine, N-acetyl-N-(3-dimethylaminopropyl)-1-adamantylmethylamine and N-formyl-N-(3-pyrrolidinylpropyl)-1-adamantyl-methylamine, when assayed as follows:

Sterile blood agar is inoculated with a 24 hour broth culture of the bacterium, Diplococcus pneumoniae, whereupon approximately 5 mg. of the test compound is placed on the inoculated agar surface. The agar is then incubated at 37° C. for 24 hours, at the end of which time it is observed for zones of inhibition in the area immediately surrounding the test compound. Compounds which are effective in causing a zone of inhibition are designated active.

The anti-protozoal property of the instant compounds is evidences by the activity of the representative compounds, i.e., N-formyl-(3-dimethylaminopropyl)-1-adamantylmethylamine, N-formyl-N-(3-piperidinopropyl)-1-adamantyl-methylamine, N-formyl-N-(2-piperidinopropyl)-1-adamantylmethylamine, N-formyl-N-[3-(4-methyl-piperazinyl)-propyl]-1-adamantylmethylamine, N-acetyl-N-(3-dimethylaminopropyl)-1-adamantyl-methylamine and N-formyl-N-(3-pyrrolidinylpropyl)-1-adamantylmethylamine 3 in the following assay:

A sterile nutrient medium composed of 12 g. of proteose peptone, 8 g. of sucrose and 1,000 ml. of distilled water is inoculated with a viable axenic culture of Tetrahymena gelleii, then is incubated at room temperature for 24 hours. At the end of that time a 0.5 ml. quantity is transferred aseptically to a test tube containing approximately 5 mg. of the test compound. A test tube containing the culture alone serves as a control. The tubes are incubated at room temperature for 24 hours, then are examined microscopically in order to determine the degree of growth of the microorganism. A compound is considered active if it results in a definite inhibition of growth as compared to the control.

The activity of the representative compounds, i.e., N-formyl-N-(3-dimethylaminopropyl)-1-adamantyl-methylamine, N-formyl-N-(3-piperidinopropyl)-1-adamantylmethylamine, N-formyl-N-(2-piperidinoethyl)-1-adamantylmethylamine, N-formyl-N-[3-(4-methyl-piperazinyl)propyl]-1 -adamantylmethylamine, N-acetyl-N-(3-dimethylaminopropyl)-1-adamantyl-methylamine and N-formyl-N-(3-pyrrolidinylpropyl-1-adamantylmethylamine in the following assay illustrates the anti-algal property of the instant compounds:

Sterile Bristol agar is inoculated with an aqueous suspension of the alga, Chlorella vulgaris, whereupon 5 mg. of the test compound is placed on the inoculated agar surface. The inoculated agar is incubated at room temperature under artificial light for 7 days, at the end of which time it is examined for microbial growth. Activity is indicated by a clear zone of inhibition of growth surrounding the test compound.

Representative of the anti-germinant property of the instant compounds is the activity of N-formyl-N-(3-dimethylaminopropyl)-1-adamantylmethylamine, N-formyl-N-(3-piperidinopropyl)-1-adamantyl-methylamine, N-formyl-N-[3-(4-methylpiperazinyl)propyl]-1-adamantylmethylamine, N-acetyl-N-(3-dimethylaminopropyl)-1-adamantylmethylamine and N-formyl-N-(3-pyrrolidinylpropyl)-1-adamantyl-methylamine when assayed as follows:

Into each of two 60 mm. Petri dishes is placed a stack of three 42.5 mm. filter paper discs and each stack is moistened with 2 ml. of distilled water. Ten Trifolium repens (white clover) seeds are then arranged at approximately equal intervals around the periphery of each stack and approximately 5 mg. of the test compound is placed in the center of one seed circle. The other dish serves as a control. The dishes are then covered with glass lids and incubated at room temperature for 10 days, at the end of which time germination in the two dishes is compared.

The anti-spasmodic property of the instant compounds is evidenced by the activity of N-formyl-N-(2-piperidinoethyl)-1-adamantylmethylamine, N-formyl-N-(3-piperidinopropyl)-1-adamantylmethylamine, N-formyl-N-[3-(4-methylpiperazinyl)propyl]-1-adamantylmethylamine, N-formyl-N-(3-pyrrolidinylpropyl)-1-adamantylmethylamine and N-formyl-N-(3-dimethylaminopropyl)-1-adamantylmethylamine when tested in the following assay:

Two Charles River female rats weighing 240–280 g. are treated on each of 2 successive days with diethylstilbesterol in order to induce a state of estrus. On the third day the animals are sacrificed and the uteri are removed. A 10 mm. section is taken from one of the uteri and suspended in a tissue bath containing 1.9 ml. of Tyrode's solution, prepared as described by Barns and Eltherington, "Drug Dosage in Laboratory Animals," p. 261, University of California Press, Berkeley, California (1964). The tissue bath is surrounded by a water jacket maintained at a constant temperature of 30° C. The concentration of bradykinin in the tissue bath is then gradually increased by successive additions of bradykinin dissolved in Tyrode's solution. The bradykinin solution is defined as the pD, which is the log of the reciprocal of the concentration expressed in the mg./ml. At each of the selected bradykinin concentrations, contraction of the uterus is measured in mm. by means of an E & M Physiograph used together with an Isotonic Myograph Transducer and Detecting Head. After completion of those measurements the tissue is rinsed 9 times over a period of 9 minutes with fresh Tyrode's solution. The last rinse is kept in the bath and 100 mcg. of the test compound dissolved or suspended in 0.1 ml. of Tyrode's solution is injected into the bath, which consists of 1.9 ml. of Tyrode's solution. After 10 minutes the bradykinin concentration in the bath is again increased as before by the successive additions of bradykinin dissolved in Tyrode's solution. The contractions at each concentration are measured as before and are compared with the control values, i.e., those obtained in the absence of the test compound. The identical procedure is then carried out with the 10 mm. section of uterus taken from the second animal. A compound is considered active either if it inhibits by at least 10 percent the maximum bradykinin-induced contraction or if it causes an increase of at least 0.3 pD unit in the bradykinin concentration required to effect 50 percent of the maximum contraction.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees Centigrade (°C.). Quantities of materials are expressed in parts by weight unless otherwise noted.

EXAMPLE 1

A solution containing 4 parts of N-(3-dimethylaminopropyl)adamantane-1-carboxamide, 3 parts of lithium aluminum hydride and 80 parts of dioxane is heated at the reflux temperature for about 24 hours, then is cooled and diluted successively with 3 parts of water, 20 parts of dioxane, 2.5 parts by volume of 20 percent aqueous sodium hydroxide and 10 parts of water. The precipitated inorganic salts are removed by filtration and the filtrate is concentrated to dryness under reduced pressure to afford, as an oil, N-(3-dimethylaminopropyl)-1-adamantylmethylamine.

To a solution of the latter amine in ether is added excess isopropanolic hydrogen chloride and the resulting precipitate is collected by filtration and washed with ether, then recrystallized from aqueous acetone to afford N-(3-dimethylaminopropyl)-1-adamantylmethylamine dihydrochloride, characterized by an optical rotation of +4.5°.

To a mixture of 3 parts of lithium aluminum hydride with 100 parts of dioxane is added a solution of 3.7 parts of N-(3-piperidinopropyl)adamantane-1-carboxamide in 100 parts of dioxane and the resulting reaction mixture is heated at the reflux temperature for about 16 hours. At the end of that reaction period the mixture is cooled, then diluted successively with 3 parts of water dissolved in 10 parts of dioxane, 2.25 parts by volume of 20 percent aqueous sodium hydroxide and 10.2 parts of water. The diluted mixture is filtered and the filter cake is washed with dioxane. Evaporation of the filtrate to dryness affords N-(3-piperidinopropyl)-1-adamantylmethylamine.

EXAMPLE 3

A solution containing 4 parts of N-(3-pyrrolidinylpropyl)adamantane-1-carboxamide, 4 parts of lithium aluminum hydride and 150 parts of dioxane is heated at the reflux temperature for about 16 hours, then is cooled and diluted successively with 4 parts of water, 3 parts by volume of 20 percent aqueous sodium hydroxide and 13.6 parts of water. The precipitated inorganic salts are removed by filtration and washed on the filter with dioxane. Evaporation of the filtrate to dryness under reduced pressure affords, as an oil, N-(2-pyrrolidinylethyl)-1-adamantylmethylamine.

A solution of the latter amine in ether is mixed with excess isopropanolic hydrogen chloride and the resulting precipitate is collected by filtration, then purified by recrystallization from ethanol-acetone, thus affording N-(2-pyrrolidinylethyl)-1-adamantylmethylamine dihydrochloride, melting with decomposition at about 286°–289°. It is characterized further by an optical rotation of 0°.

EXAMPLE 4

A solution containing 3 parts of N-[3-(4-methylpiperazinyl)propyl]adamantane-1-carboxamide, 3 parts of lithium aluminum hydride and 125 parts of dioxane is heated at the reflux temperature for about 7½ hours, then is diluted successively with 3 parts of water, 2.3 parts by volume of 20 percent aqueous sodium hydroxide and 10.2 parts of water. The precipitated inorganic salts are removed by filtration and washed on the filter with dioxane. Concentration of the combined filtrate and washings under reduced pressure affords, as an oil, N-[3-(4-methylpiperazinyl)-propyl]-1-adamantylmethylamine, characterized by an optical rotation of +5°.

An ethereal solution of the latter amine is treated with excess isopropanolic hydrogen chloride and the resulting precipitate is purified by recrystallization from aqueous ethanol. The resulting plate-like crystals are collected by filtration and dried to afford N-[3-(4-methylpiperazinyl)-propyl]-1-adamantylmethylamine trihydrochloride, melting with decomposition at about 294°–296°. This compound is further characterized by an optical rotation of 0°.

EXAMPLE 5

A mixture containing 1.8 parts of lithium aluminum hydride and 60 parts of dioxane is added to 2.1 parts of N-(2-piperidinoethyl)adamantane-1-carboxamide and the resulting reaction mixture is heated at the reflux temperature for about 24 hours, then is diluted successively with a solution of 1.8 parts of water in 20 parts of dioxane, 1.5 parts by volume of 20 percent aqueous sodium hydroxide and 1 part of water. Removal of the precipitated inorganic salts followed by washing of the filter cake with dioxane affords a filtrate, which is concentrated under reduced pressure to produce, as an oil, N-(2-piperidinoethyl)-1-adamantylmethylamine.

EXAMPLE 6

A mixture containing 5.3 parts of N-(3-pyrrolidinylpropyl)adamantane-1-carboxamide, 4.2 parts of lithium aluminum hydride and 150 parts of dioxane is heated at the reflux temperature for about 16 hours, then is cooled and diluted successively with a solution of 4.5 parts of water in 15 parts of dioxane, 3.4 parts by volume of 20 percent aqueous sodium hydroxide and 15.3 parts of water. Filtration of that mixture followed by washing of the filter cake with dioxane affords a filtrate, which is stripped of solvent under reduced pressure. The oily product thus obtained is N-(3-pyrrolidinylpropyl)-1-adamantylmethylamine.

EXAMPLE 7

When an equivalent quantity of N-(2-diethylaminoethyl)adamantane-1-carboxamide is substituted in the procedure of Example 1, there is produced N-(211-adamantylmethylamine.

EXAMPLE 8

The substitution of an equivalent quantity of N-(3-diethylaminopropyl)adamantane-1-carboxamide in the procedure described in Example 1 results in N-(3-diethylaminopropyl)-1-adamantylmethylamine.

EXAMPLE 9

When an equivalent quantity of N-(3-morpholinopropyl)adamantane-1-carboxamide is substituted in the procedure of Example 1, there is obtained N-(3-morpholinopropyl)-1-adamantylmethylamine.

EXAMPLE 10

The substitution of an equivalent quantity of N-[3-(4-ethylpiperazinyl) propyl]adamantane-1-carboxamide in the procedure of Example 1 results in N-[3-(4-ethylpiperazinyl)-propyl]-1-adamantylmethylamide.

EXAMPLE 11

A mixture of 15.9 parts of formic acid and 13 parts of acetic anhydride is prepared and cooled to room temperature, then is added to 2 parts of N-(3-dimethylaminopropyl)-1-adamantylmethylamine. The resulting reaction mixture is heated on the steam bath for about 3½ hours, at the end of which time it is diluted with water. The resulting aqueous mixture is made alkaline by the addition of 20 percent aqueous sodium hydroxide, during which addition the mixture is cooled. Extraction of that alkaline mixture with ether affords an organic solution, which is washed with water, dried over anhydrous sodium sulfate, then stripped of solvent under nitrogen. The initially oily produce solidifies upon standing, thus affording N-formyl-N-(3-dimethylaminopropyl)-1-adamantyl-methylamine. This compound is represented by the following structural formula

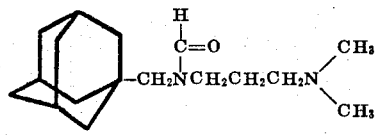

EXAMPLE 12

A cooled mixture consisting of 24.4 parts of formic acid and 20 parts of acetic anhydride is added to 3 parts of N-(3-piperidinopropyl)-1-adamantylmethylamine and the resulting reaction mixture is heated on a steam bath for about 4 hours. Water is added at the end of that time and the mixture is cooled, then made alkaline by the addition of 20 percent aqueous sodium hydroxide. This alkaline mixture is extracted with ether and the ether solution is separated, washed with water, dried over anhydrous sodium sulfate containing decolorizing carbon and stripped of solvent by distillation under reduced pressure. The initially oily residue solidifies upon standing and is purified by sublimation to afford N-formyl-N-(3-piperidinopropyl)-1-adamantylmethylamine, melting at about 61°–62.5°. This compound is represented by the following structural formula

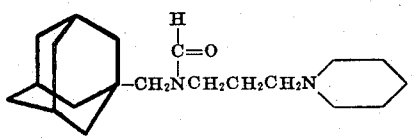

EXAMPLE 13

A cooled mixture of 25.6 parts of formic acid with 21 parts of acetic anhydride is added to 2 parts of N-(2-piperidinoethyl)-1-adamantylmethylamine and the resulting mixture is heated on a steam bath for about 4 hours. The addition of water affords an aqueous solution, which is made alkaline by adding, with cooling, 20 percent aqueous sodium hydroxide. Extraction of that mixture with ether affords an organic solution, which is washed with water, dried over anhydrous sodium sulfate and concentrated to dryness under reduced pressure. The oily residue solidifies upon standing and is purified by recrystallization from hexane, thus affording N-formyl-N-(2-piperidinoethyl)-1-adamantylmethylamine. It is represented by the following structural formula

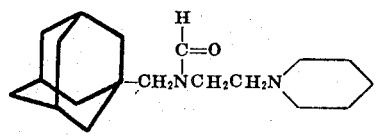

EXAMPLE 14

A cooled mixture of 24.4 parts of formic acid with 20 parts of acetic anhydride is added to 1.9 parts of N-[3-(4-methylpiperazinyl)propyl]-1-adamantyl-methylamine and the resulting reaction mixture is heated on a steam bath for about 3½ hours. Approximately 24 parts of methanol together with ice is then added and the mixture is made alkaline by the addition of 20 percent aqueous sodium hydroxide. Extraction of that mixture with ether affords an organic solution, which is washed with water, dried over anhydrous sodium sulfate containing decolorizing carbon and stripped of solvent by distillation under reduced pressure. The oily residue is purified by recrystallization from hexane, thus affording N-formyl-N-[3-(4-methylpiperazinyl)propyl]-1-adamantylmethylamine, melting at about 90°–91.5°. This compound is represented by the following structural formula

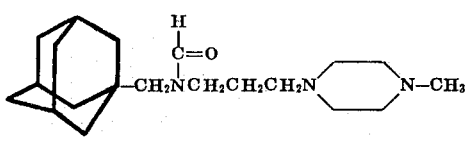

EXAMPLE 15

A mixture of 3 parts of N-(3-dimethylaminopropyl)-1-adamantylmethylamine and 24 parts of acetic anhydride is allowed to stand at room temperature for about 16 hours, then is poured carefully into water. The resulting aqueous solution is made alkaline by the addition of dilute aqueous sodium hydroxide, then is extracted with an ether-methanol solution. That organic solution is washed with water, dried over anhydrous sodium sulfate and evaporated to dryness to afford, as an oil, N-acetyl-N-(3-dimethylaminopropyl)-1-adamantylmethylamine. The compound is represented by the following structural formula

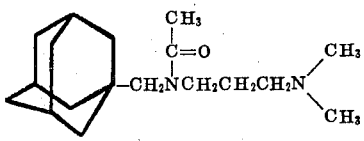

EXAMPLE 16

A cooled mixture containing 30.5 parts of formic acid and 25 parts of acetic anhydride is added to 2 parts of N-(3-pyrrolidinylpropyl)-1-adamantylmethylamine and that reaction mixture is heated on a steam bath for about 3½ hours. At the end of that time methanol and ice are added and the resulting aqueous mixture is made alkaline by the addition of 20 percent aqueous sodium hydroxide. Extraction of that alkaline mixture with ether affords an organic solution, which is washed with water, dried over anhydrous sodium sulfate containing decolorizing carbon and concentrated to dryness under reduced pressure. The resulting oily product is purified by recrystallization from hexane, thus producing N-formyl-N-(3-pyrrolidinylpropyl)-1-adamantylmethylamine. This compound is represented by the following structural formula

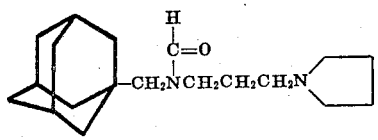

EXAMPLE 17

The substitution of an equivalent quantity of N-(2-diethylaminoethyl)-1-adamantylmethylamine in the procedure of Example 11 results in N-formyl-N-(2-diethylaminoethyl)-1-adamantylmethylamine.

EXAMPLE 18

When an equivalent quantity of N-(3-diethylaminopropyl)-1-adamantylmethylamine is substituted in the procedure of Example 11, there is produced N-formyl-N-(3-diethylaminopropyl)-1-adamantylmethylamine.

EXAMPLE 19

By substituting an equivalent quantity of N-(3-morpholinopropyl)-1-adamantylmethylamine and otherwise proceeding according to the processes described in Example 11, there is produced N-formyl-N-(3-morpholinopropyl)-1-adamantylmethylamine.

EXAMPLE 20

The substitution of an equivalent quantity of N-[3-(4-ethylpiperazinyl) propyl]-1-adamantylmethylamine in the procedure described in Example 11 results in N-formyl-N-[3-(4-ethylpiperazinyl)propyl]-1-adamantylmethylamine.

EXAMPLE 21

By substituting an equivalent quantity of propionic anhydride and otherwise proceeding according to the processes described in Example 15, there is obtained N-propionyl-N-(3-dimethylaminopropyl)-1-adamantylmethylamine.

What is claimed is:

1. A compound of the formula

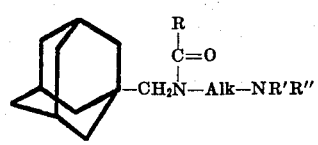

wherein R is selected from the group consisting of hydrogen and lower alkyl, Alk is lower alkylene and NR'R'' is di-(lower alkyl)amino, pyrrolidinyl, piperidino, morpholino or 4-(lower alkyl)piperazin-1-yl.

2. As in claim 1, a compound of the formula

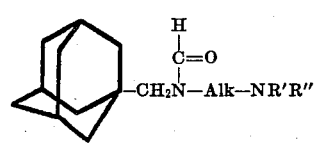

wherein Alk is lower alkylene and NR'R'' is di-(lower alkyl)amino, pyrrolidinyl, piperidino, morpholino or 4-(lower alkyl)piperazin-1-yl.

3. As in claim 1, a compound of the formula

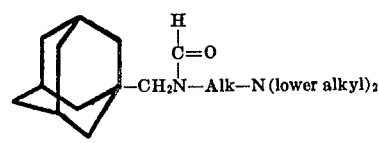

wherein Alk is a lower alkyl radical.

4. As in claim 1, the compound which is N-formyl-N-(3-dimethylaminopropyl)-1-adamantylmethylamine.

5. As in claim 1, the compound which is N-formyl-N-(3-piperidinopropyl)-1-adamantylmethylamine.

6. As in claim 1, the compound which is N-formyl-N-2-piperidinoethyl)-1-adamantylmethylamine.

7. As in claim 1, the compound which is N-formyl-N-[3-(4-methylpiperazinyl)propyl]-1-adamantylmethylamino.

8. As in claim 1, the compound which is N-acetyl-N-(3-dimethylaminopropyl)-1-adamantylmethylamine.

9. As in claim 1, the compound which is N-formyl-N-(3-pyrrolidinylpropyl)-1-adamantylmethylamine.

* * * * *